US011017118B2

(12) United States Patent
Curtis et al.

(10) Patent No.: US 11,017,118 B2
(45) Date of Patent: May 25, 2021

(54) COGNITIVE SURVEY POLICY MANAGEMENT

(71) Applicant: International Business Machines Corporation, Armonk, NY (US)

(72) Inventors: John D. Curtis, Milford, MA (US); Sheela Shetty, Littleton, MA (US); Charlotte C. Dye, Somerville, MA (US); Derek V. Duoba, Austin, TX (US); Anup M. Patil, Lowell, MA (US); Walter L. Tucker, Carlisle, MA (US)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 16/205,488

(22) Filed: Nov. 30, 2018

(65) Prior Publication Data
US 2020/0175204 A1 Jun. 4, 2020

(51) Int. Cl.
*G06F 21/62* (2013.01)
*G06F 16/22* (2019.01)

(52) U.S. Cl.
CPC .......... *G06F 21/6254* (2013.01); *G06F 16/22* (2019.01)

(58) Field of Classification Search
CPC .. G06F 21/62; G06F 21/6218; G06F 21/6227; G06F 21/6245; G06F 21/6254; G06F 2221/2141; Y04S 50/14
See application file for complete search history.

(56) References Cited

U.S. PATENT DOCUMENTS

| 6,189,029 | B1 | 2/2001 | Fuerst | |
| 6,768,994 | B1* | 7/2004 | Howard | G06F 16/9537 |
| 6,912,521 | B2 | 6/2005 | Kraft et al. | |
| 8,694,357 | B2 | 4/2014 | Ting et al. | |
| 9,288,184 | B1* | 3/2016 | Kvamme | H04L 63/02 |
| 9,779,260 | B1* | 10/2017 | Brisebois | G06F 21/6227 |
| 2003/0014654 | A1* | 1/2003 | Adler | G06F 21/6245 726/6 |

(Continued)

FOREIGN PATENT DOCUMENTS

WO WO-2012136652 A1 * 10/2012 ......... G06F 21/6263

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Eric W Shepperd
(74) *Attorney, Agent, or Firm* — Daniel C. Housley

(57) ABSTRACT

While managing private data in cognitive surveys, a method, system, and computer program product may deploy a set of gather agents. Access credentials for a plurality of participants may be obtained from an encrypted data store and verified. The set of gather agents may gather a set of target data associated with the plurality of participants, and the set of target data may be collected according to a set of policy criteria. It may be determined whether one or more participants of the plurality of participants has requested to review a subset of the target data, and those participants may be prompted to review the subset of target data. It may be determined whether the one or more participants rejected the subset of target data. The subset of target data may be filtered, and the filtered subset of target data may be posted to a results database.

20 Claims, 5 Drawing Sheets

(56) References Cited

U.S. PATENT DOCUMENTS

| | | | |
|---|---|---|---|
| 2009/0055431 A1* | 2/2009 | Brodie | G06F 16/367 |
| 2009/0254511 A1* | 10/2009 | Yeap | G06Q 30/01 |
| 2009/0327296 A1* | 12/2009 | Francis | G06F 16/00 |
| 2011/0055264 A1 | 3/2011 | Sundelin et al. | |
| 2011/0213722 A1* | 9/2011 | Carson | G06Q 10/10 |
| | | | 705/317 |
| 2013/0204886 A1* | 8/2013 | Faith | G06Q 30/06 |
| | | | 707/756 |
| 2013/0291058 A1 | 10/2013 | Wollenstein et al. | |
| 2013/0332362 A1 | 12/2013 | Ciurea | |
| 2014/0032665 A1* | 1/2014 | Weinberg | H04L 67/02 |
| | | | 709/204 |
| 2014/0278781 A1* | 9/2014 | Liu | G06Q 30/0203 |
| | | | 705/7.32 |
| 2015/0286627 A1* | 10/2015 | Chang | G06F 40/205 |
| | | | 704/9 |
| 2015/0372997 A1* | 12/2015 | Lokamathe | H04L 63/062 |
| | | | 713/171 |
| 2017/0032143 A1 | 2/2017 | Kong et al. | |
| 2017/0068827 A1 | 3/2017 | Sachs | |
| 2017/0315712 A1* | 11/2017 | Curtis | G06F 3/0605 |
| 2018/0075492 A1* | 3/2018 | Squire | G06Q 30/0271 |
| 2019/0034808 A1* | 1/2019 | Palanichamy | G06F 21/6245 |
| 2019/0228105 A1* | 7/2019 | Ma | G06F 16/951 |

* cited by examiner

COGNITIVE SURVEY POLICY MANAGEMENT

BACKGROUND

The present disclosure relates generally to the field of cognitive surveys, and more particularly to managing private data for cognitive surveys.

Surveys are used to obtain information regarding a variety of topics, such as client satisfaction, research, etc. Conventional survey methods may suffer from a lack of participation, a lack of candor (e.g., untrustworthy results), etc. Further, manually participating in surveys may be a distraction for some participants, and may be time-consuming, thereby inhibiting participant efficiency in other tasks.

SUMMARY

Disclosed herein are embodiments of a method, system, and computer program product for managing private data for cognitive surveys.

A set of gather agents may be deployed. Access credentials for a plurality of participants may be obtained from an encrypted data store. It may be determined whether the access credentials are valid. The set of gather agents may gather a set of target data associated with the plurality of participants, and the set of target data may be collected according to a set of policy criteria. It may be determined whether one or more participants of the plurality of participants has requested to review a subset of the target data. The one or more participants may be prompted to review the subset of target data. It may be determined whether the one or more participants rejected the subset of target data. The subset of target data may be filtered, and the filtered subset of target data may be posted to a results database.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
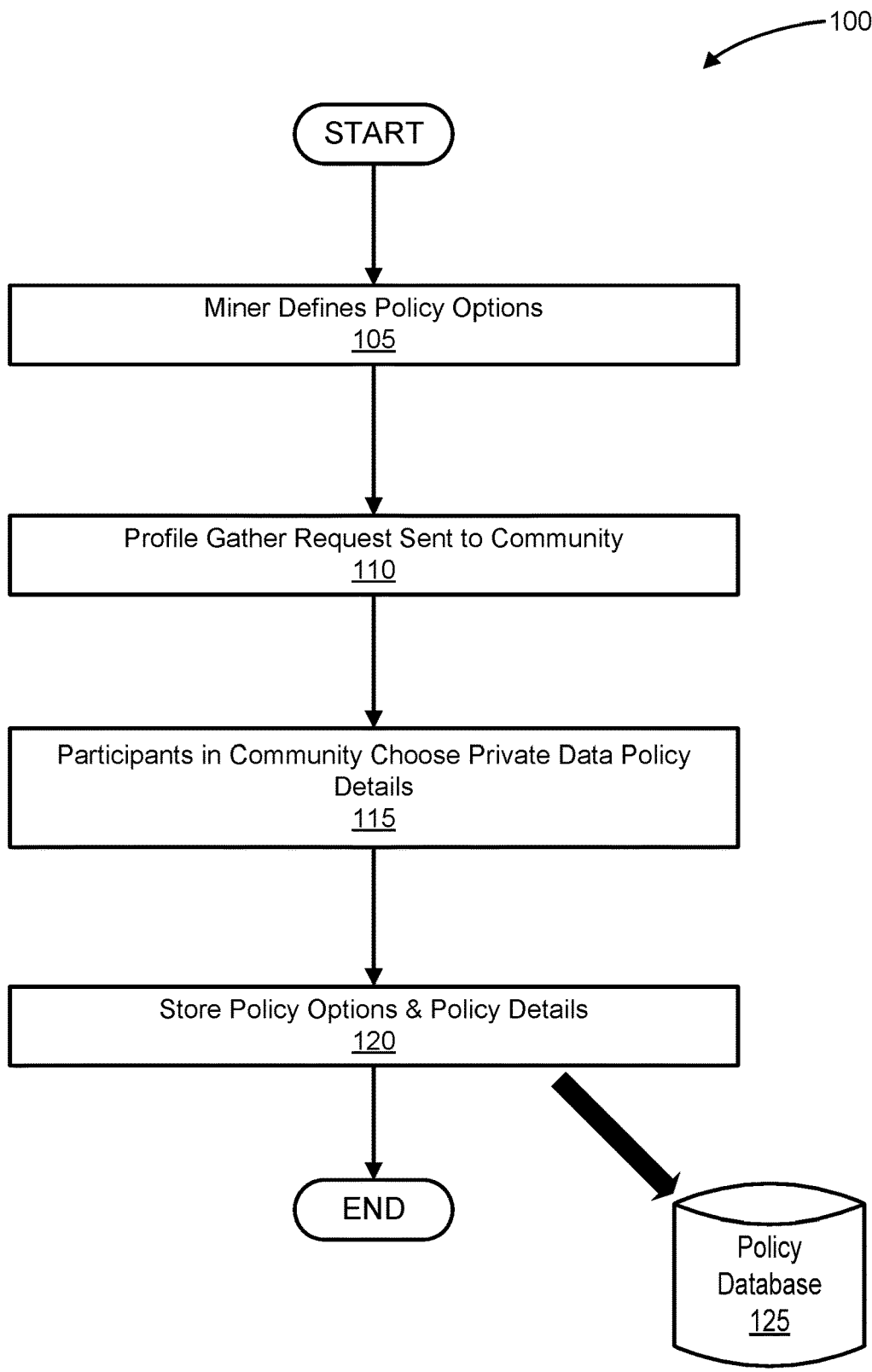
FIG. 1 illustrates a flowchart of a method for determining policy criteria, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cognitive surveys, and more particularly to managing private data for cognitive surveys. While the present disclosure is not necessarily limited to such applications, various aspects of the disclosure may be appreciated through a discussion of various examples using this context.

Universal best practices, and in some cases laws (e.g. the Health Information Portability and Accountability Act, the General Data Protection Regulation, etc.), dictate that confidentiality and protection of sensitive personal data (e.g. personal health information, personally-identifying information, protected status of individuals, etc.) be maintained and honored. The present disclosure may provide advantages in the form of proper and uniform handling of sensitive data, enhanced legal compliance, time savings, cost savings, reducing the processing necessary to review data and remove private information, and others.

Embodiments of the present disclosure may include, but are not necessarily limited to: policy option determination, policy detail selection, data gathering, and post-processing of results.

Policy Option Determination:

An entity referred to as a "Miner" may include one or more individuals whose job it is to produce a particular survey. The Miner may determine the set of permissions/options to be presented as choices (e.g., "policy details," described below) for survey participants. The Miner may decide to offer certain options, while withholding others, in a particular survey. For example, the Miner may include an option to self-identify (e.g., for a participant to decide whether to allow their name or employee number, for example to be included in the survey results) to a set of participants, either individually or on a group basis. This may allow for greater flexibility in survey design, which in turn may enhance survey participation rates and allow for deeper data insights from key members (e.g., subject matter experts) within a particular group/community.

Policy options may be grouped in such a way that one set of policy options may be chosen for one group of participants, while a second set may be chosen for a second group of participants. Such disparate policy option choices may be driven by business needs, by participant demographics, etc. Policy options may, in some embodiments, have default settings (e.g., certain options may be "selected" or "deselected," by default). For example, a Miner may create a default setting where personal health information is always deselected, or excluded from collection during a data gathering phase.

Policy options may include, but are not necessarily limited to, the ability to opt-in/opt-out (e.g., allowing a participant to actively select to take a survey/allowing a participant to decline a survey that is actively presented to him/her) exclude a particular e-mail/post/data object from consideration (e.g., using a metadata tag, "confidential" marker, hashtag, etc.); the ability to exclude an entire community/forum thread/e-mail thread, etc.; the ability to require all possible data be collected; the ability to require all possible data be collected with the exception of one or more categories of sensitive information (e.g., personal health information, personally-identifying information, names, employee numbers, etc.); the ability to require all data be de-identified/anonymized prior to posting to the results database; and the ability to require the raw data be maintained confidential, allowing only aggregate analysis output to be reported.

Policy Detail Selection:

Once the Miner has selected the policy options, survey participants may be allowed to select policy details. Policy details may include many of the same aspects as the policy options. For example, even if the Miner would like to collect participants' phone numbers, each participant may configure their policy details to restrict his/her phone number(s) from being gathered, or to choose which phone number(s), if the participant has multiple phone numbers, should be shared.

In embodiments, groups of participants may be grouped under different sets of policy options, and may therefore have a different set of policy details to configure. For example, a group of accountants may grouped under a policy option that pre-selects the exclusion of any e-mails including "budget" in the subject, but a group of the accountants' administrative assistants may not have this pre-selected exclusion.

Once policy options and policy details (collectively referred to as "policy criteria") have been selected/configured they may be stored in a policy database. In embodiments, the policy database may be access-restricted, encrypted, or otherwise secured.

Data Gathering:

Data collection/gathering may be performed using crawlers, scrapers, etc. (collectively referred to as "gather agents") that may roam/crawl through the target data sources (e.g., collections of organization collaboration artifacts, forums, e-mail repositories, profiles, communities, chat service logs, etc.).

Participants may choose to share their access credentials (also referred to as simply, "credentials") for the target data sources, if needed, to allow the gather agents to access their data. In embodiments, a specific gather agent may exist for each target data source. Provided credentials may be stored in an encrypted store to preserve the security of the target data sources and the participants' information. In embodiments where the Miner already owns, or has access to, all of the relevant data, a "super-admin" password may be employed to access the data, as opposed to individual credentials for each participant.

The process of gathering data may involve several steps, depending upon the policy criteria. The process may nevertheless begin with access to the target data stores. In embodiments, the data gathering may be initiated in response to a Miner's submission of a particular survey. In other embodiments, the data gathering may be continuously performed in order to maintain a robust corpus of data, from which surveys may draw raw data for processing and interpretation. As discussed herein, participant credentials will need to be gathered at least once and stored into an encrypted credentials repository (also referred to as an "encrypted disk"). The credentials must be verified, and if they are found invalid, new/current credentials may be requested from the participant.

Once access to the target data stores is established, a gather agent may be deployed to gather the raw target data, according to the policy criteria. To enact exclusion rules, content of the target data store may be searched to see if any exclusion criteria is met (e.g., whether the content includes a "confidential" tag, the appropriate hashtag, etc.). If so, that raw target data may be excluded and/or left ungathered. This may improve performance by reducing the data size retrieved, and may also prevent antecedent data deletion and filtering. In embodiments, raw target data with certain exclusions may be edited/modified to redact or otherwise remove the restricted data (e.g., names, employee numbers, etc.), while still allowing the rest of the text/data to be gathered.

If the line item editing has been enabled as a policy option, and the participant has chosen it as part of their policy detail configuration, the participant may be presented with the results as they will be returned to the survey, in order to perform a line-item review and edit the results, as desired. In embodiments, line-item review edits may be applied as a filter to the results. In embodiments, the Miner may configure a general results review for participants, and participants may, if they are unsatisfied with their results (e.g., if the participant rejects the results), further request a line-item review in order to exclude or edit a particular data point or result line (e.g., to filter the results, according to the participant's desires), thereby creating a subset of result data. In other embodiments, a particular participant's results may be reviewed by a second participant. For example, one participant may request a second participant to "proofread" through their survey results to ensure no unwanted disclosures of private information have been overlooked.

Once the results have been gathered and, possibly, undergone line-item editing/filtering, they may be stored in a survey results database. From there, post-processing and cumulative survey results may be produced and presented to the Miner. In embodiments, it may be possible that some results are unattainable from the data in the results database. In such instances, participants may be actively presented with those particular survey questions, or the gather agents may request greater access to a participant's data to collect the missing information. In yet other embodiments, the unattainable results may simply be omitted and/or the participant may be omitted from the survey. In yet other embodiments, the participant may be presented with the partially-populated survey results, and prompted to answer the remaining questions, if desired.

Post-Processing of Results:

Once the raw (e.g., unanalyzed/unprocessed) target data has been collected, cognitive results may be produced, and any anonymization/sanitization/aggregation of the data may be performed to remove any personal or sensitive data, or to exclude any information that a participant has objected to or opted out of at the policy detail level.

As described herein, both cognitive and non-cognitive results processing and survey reporting capabilities may be offered in various embodiments. Cognitive features may include (but are not limited to), for example: entity extraction (e.g., identification of persons/places/objects), sentiment analysis (e.g., determining an emotional aspect of text), keyword extraction (e.g., determining, from context, which word(s) are most important), concept tagging (e.g., extracting overarching concepts by associating pronouns back to previous references), relation extraction (e.g., determining, via context, how two objects/people are related), taxonomy classification (e.g., determining, using the contents of a text, a classification for the text itself), expertise extraction (e.g., determining that a text is directed to an esoteric audience and identifying said audience), language detection, text extraction, and linked data support (e.g., creating one set of data out of multiple sets of data, creating data webs, etc.).

Non-cognitive features may include, but are not limited to: statistical analyses (e.g., averages, pi-squared analyses, chi distributions, ANOVA (analysis of variance), ANCOVA (analysis of covariance), Poisson distributions, Bell curves, etc.), cross-community aggregate analyses, and links-and-attachment analyses.

Figure 2:
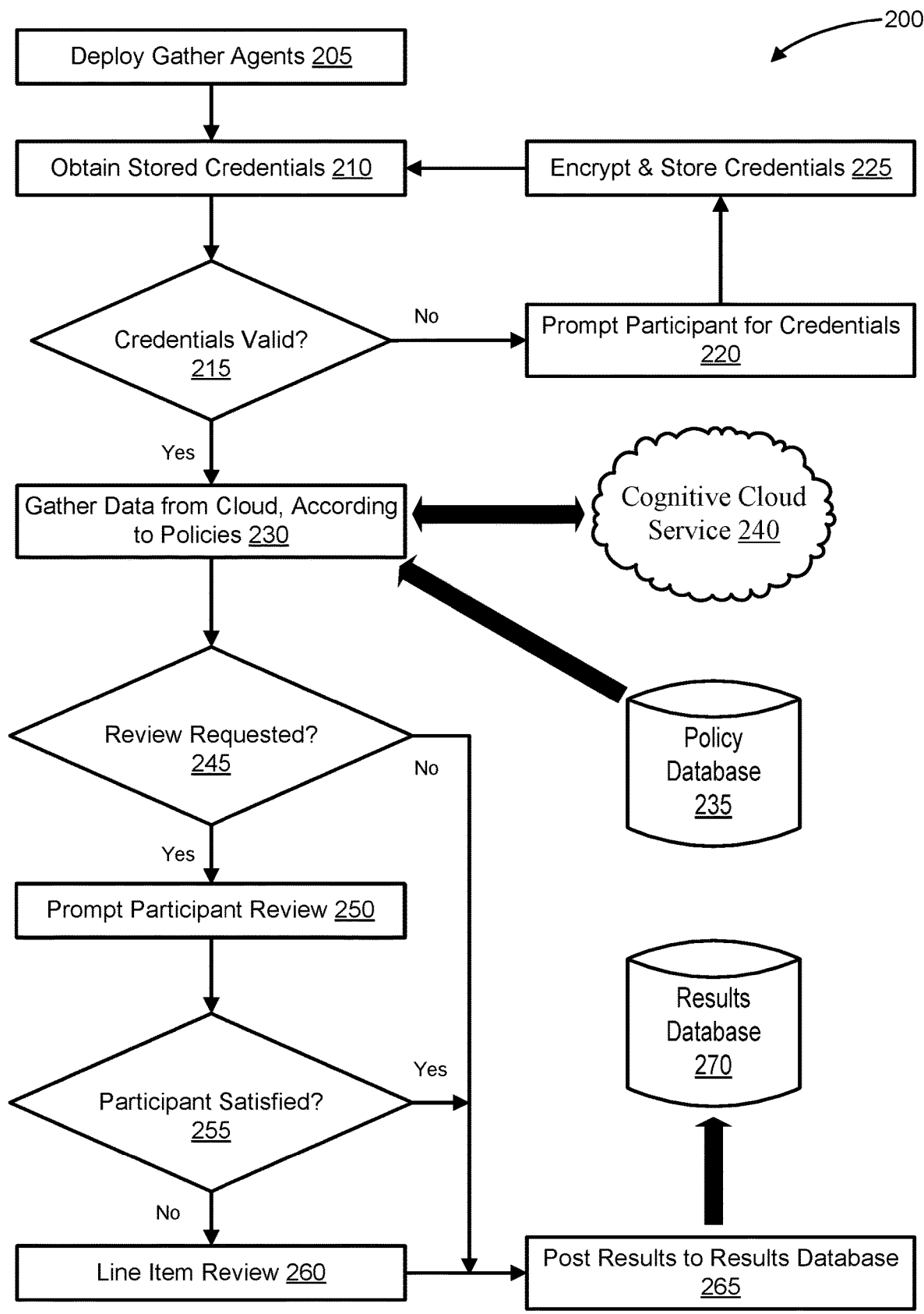
FIG. 2 illustrates a flowchart of a method for conducting surveys while simultaneously managing private data, according to embodiments.

In embodiments, the raw data may provide a corpus of data (e.g., a corpus substantially similar to a results database, as described in FIG. 2), which may be queried to provide the data necessary to address a particular survey's questions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs (personal digital assistants)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

As discussed above, aspects of the disclosure may relate to the field of cognitive surveys, and more particularly to managing private data for cognitive surveys. Accordingly, an understanding of the embodiments of the present disclosure may be aided by describing examples of a computing environment for an object storage system and an example of a method for implementing embodiments of the present disclosure.

Referring now to FIG. 1, illustrated is a flowchart of a method 100 for determining policy criteria, according to embodiments. At 105, a Miner defines policy options. As described herein, the Miner may be the person/persons in charge of designing the survey and/or overseeing the data collection for the survey. The Miner may determine the set of policy options to be presented as choices (e.g., "policy details") for survey participants. The Miner may decide to offer certain options, while withholding others, in a particular survey, as described herein. Further, policy options may be grouped in such a way that one set of policy options may be chosen for one group of participants, while a second set may be chosen for a second group of participants.

Policy options may include, but are not necessarily limited to, the ability to exclude a particular e-mail/post/data object from consideration (e.g., using a metadata tag, "confidential" marker, hashtag, etc.); the ability to exclude an entire community/forum thread/e-mail thread, etc.; the ability to require all data be de-identified/anonymized prior to posting to the results database; and the ability to require the raw data be maintained confidential, allowing only aggregate analysis output to be reported.

At 110, a profile gather request may be sent to the target community (e.g., the group of survey participants). A profile may include the policy details chosen by a particular participant. As described herein, policy details may include many of the same aspects as the policy options. In embodiments, groups of participants may be grouped under different sets of policy options, and may therefore have a different set of policy details to configure, as described herein.

At 115, participants in the target community choose their private data policy details. As described herein, individual participants may, within the parameters offered by the Miner's policy options, determine which data points and/or which aspects of data points to share with the gather agents.

At 120, the policy options and policy details, collectively referred to as the policy criteria, are stored in policy database 125. Policy database may be encrypted or otherwise secured, and may be local, remote, or distributed across multiple nodes of a cloud computing environment.

Referring now to FIG. 2, illustrated is a flowchart of a method 200 for conducting surveys while simultaneously managing private data, according to embodiments. At 205, gather agents are deployed. As described herein, gather agents may include programs configured to mine data from particular target data stores. Gather agents may be configured to constantly gather data in real time, to gather at particular intervals, to monitor for file edits in the target data store and reflexively gather data from the updated file(s), to gather in response to a particular request, etc. In embodiments, a single gather agent may be configured to gather data across multiple target data stores.

At 210, the stored credentials of the target participant community are obtained. As described herein, the stored credentials may be stored on an encrypted disk, a virtualized encrypted disk, or other secure device or storage scheme. The stored credentials may provide access privileges to participants' data in the target data stores.

At 215, it is determined whether the obtained credentials are valid. If one or more participants' credentials are invalid, then the participant(s) are prompted to provide their credentials at 220.

At 225, the provided credentials are encrypted and securely stored in an encrypted disk or other secure storage device, as described herein.

If, at 215, the credentials are found to be valid, then the gather agents employ the credentials at 230 to gather the target data from the target data stores via cognitive cloud service 240. The target data is gathered according to the policy criteria, established by the Miner and the participants, which is stored in policy database 235. In embodiments, the target data stores may be local to the Miner and/or gather agents, thus negating the need to gather data via the cloud. In embodiments, gather agents may benefit from updates that allow them to successfully navigate and/or bypass certain gatekeeping measures (e.g., captchas, "Are you a robot?" boxes, etc.); this may not be possible or desirable in all environments, and may therefore be limited to the target data stores that are under the direct control of the Miner.

At 245, it is determined whether one or more participants has requested a review of the collected data/results. This may be done by querying the policy criteria.

If, at 245, a review has been requested, then the review is prompted to the participant at 250.

If, at 245, it is determined that a review was not requested, then the results may simply be posted to the results database 270 at 265. In embodiments, post-processing and cognitive features may be applied to the raw results from results database 270, as described herein.

At 255, it may be determined whether the participant is satisfied. For example, once the participant has concluded the review, they may confirm their survey results and/or submit them manually.

If it is determined the participant is satisfied at 255, the results may then post to the results database 270 at 265, as described herein.

If, however, it is determined at 255 that the participant is not satisfied, the participant may then perform a line-item review at 260. As described herein, a line-item review may allow a participant to exclude certain data and or aspects of certain data from their results. Upon conclusion of the line-item review at 260, the results are posted to the results database 270, at 265. In embodiments, line-item review may be employed as a results filter.

Figure 3:
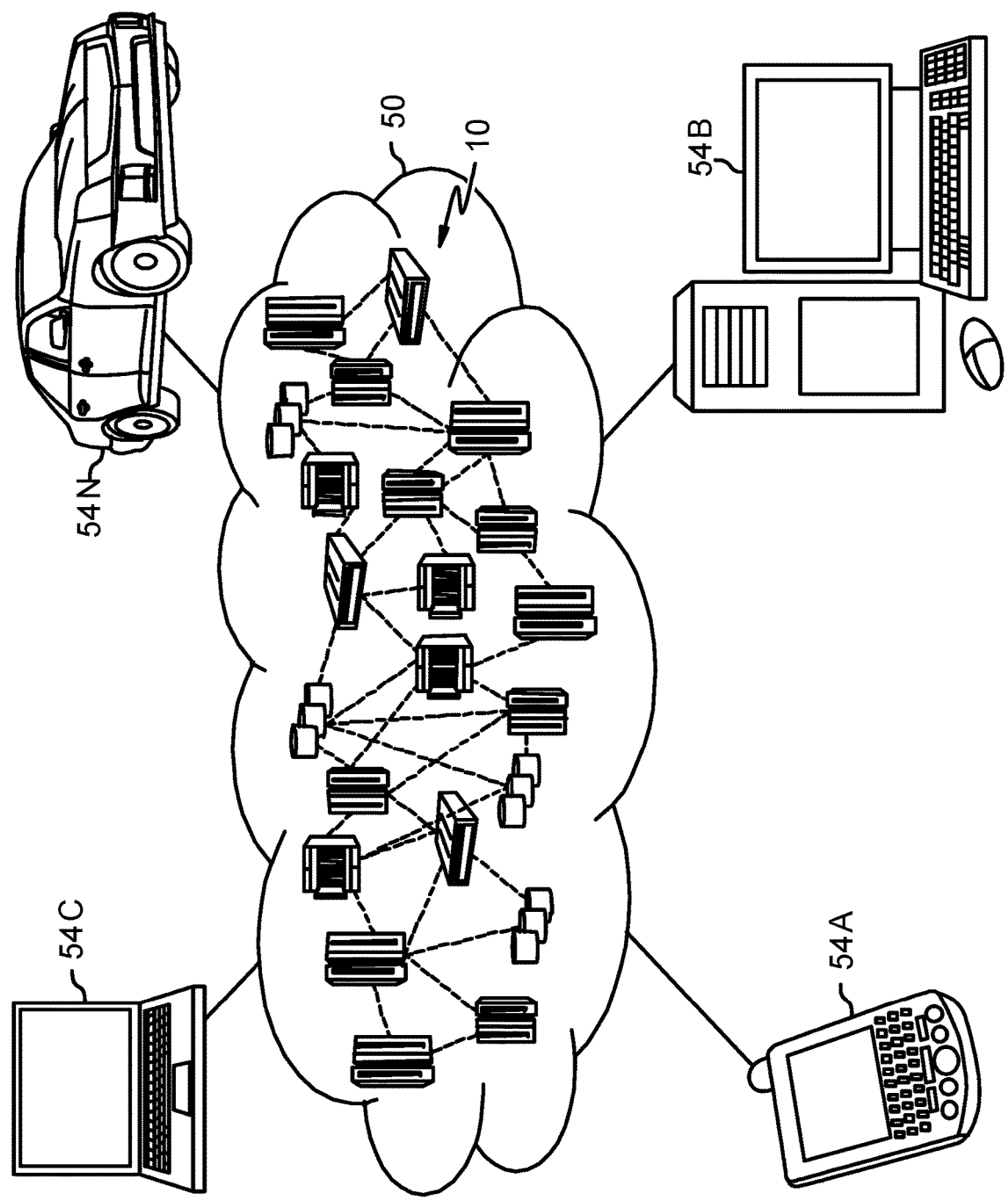
FIG. 3 depicts a cloud computing environment according to an embodiment of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
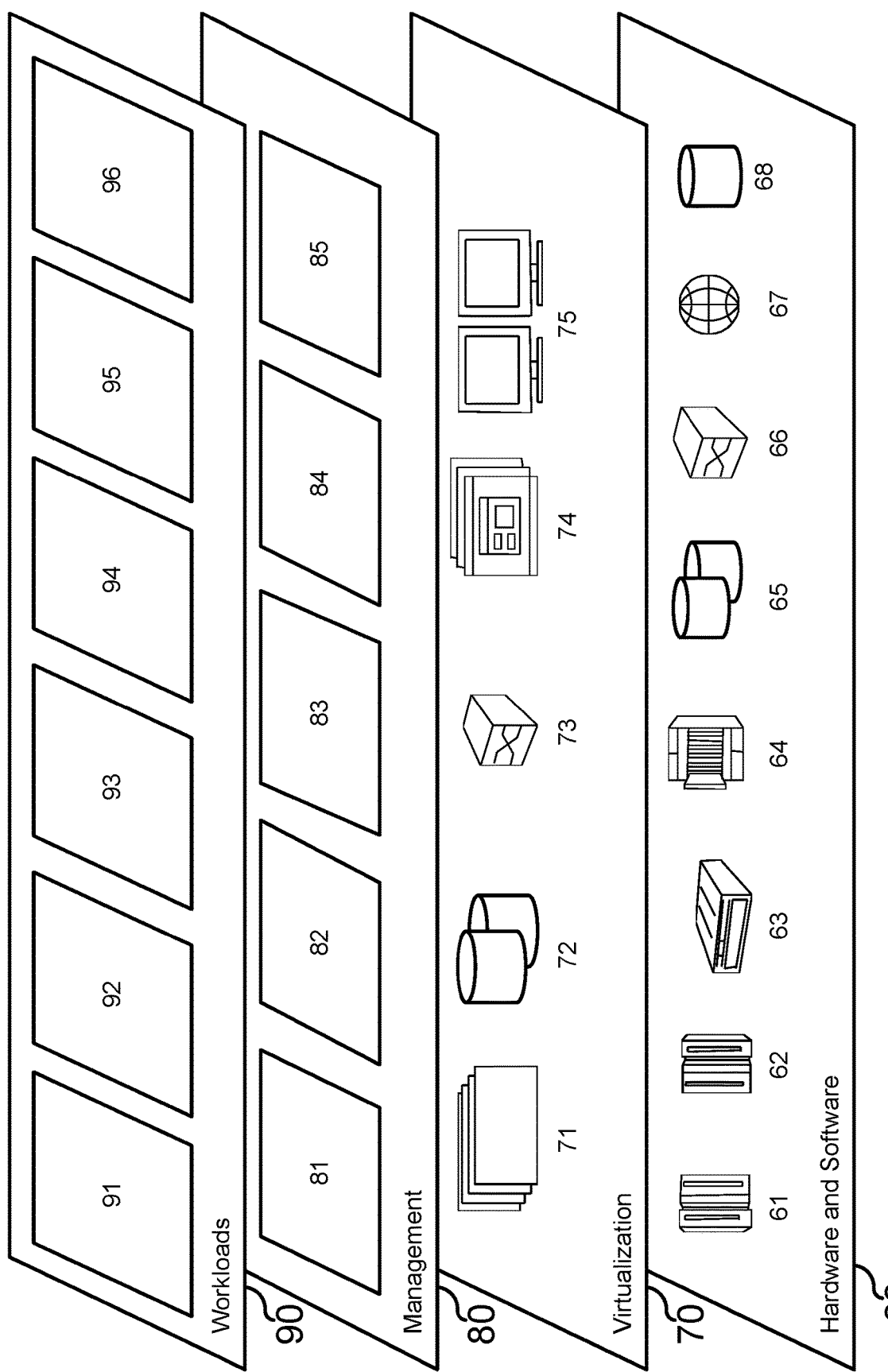
FIG. 4 depicts abstraction model layers according to an embodiment of the present invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing private data for cognitive surveys 96.

Figure 5:
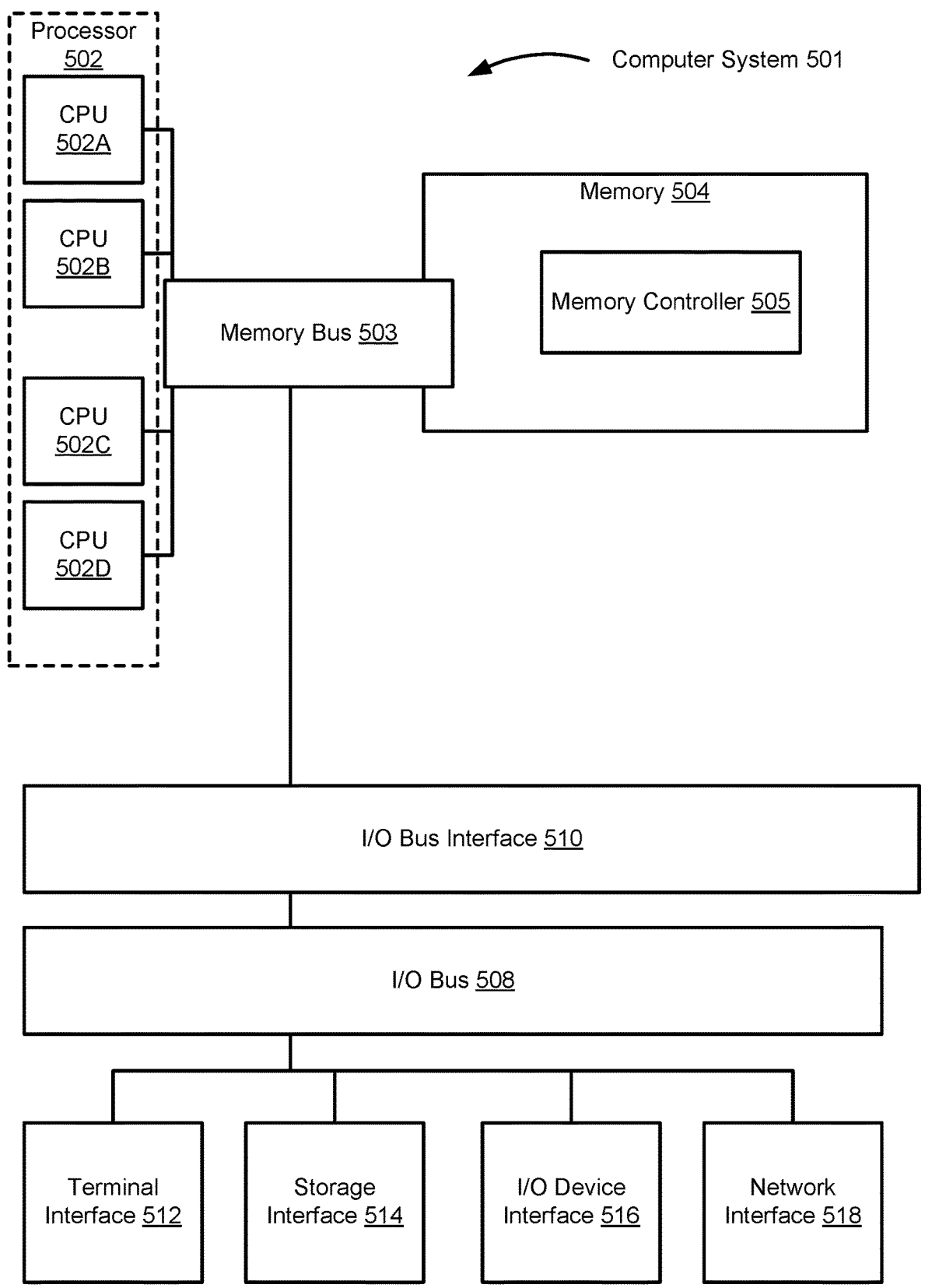
FIG. 5 depicts a high-level block diagram of an example computer system that may be used in implementing embodiments of the present disclosure.

Referring now to FIG. 5, shown is a high-level block diagram of an example computer system (e.g., computer) 501 that may be configured to perform various aspects of the present disclosure, including, for example, methods 100/200, described in FIGS. 1/2. The example computer system 501 may be used in implementing one or more of the methods or modules, and any related functions or operations, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 501, and may also include the virtual memory of other computer systems coupled to the computer system 501 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing private data for surveys, comprising:
   deploying a set of gather agents;
   gathering, by the set of gather agents, a plurality of target data associated with a plurality of participants, wherein a first set of target data within the plurality of target data is collected according to a first set of policy criteria for a first participant, and wherein a second set of target data within the plurality of target data is collected according to a second set of policy criteria for a second participant;
   determining the first participant has requested to review a subset of the first set of target data;
   prompting the first participant to review the subset of target data;
   determining the first participant rejected the subset of target data;
   filtering the subset of target data;
   posting the filtered subset of target data and the second set of target data to a results database;
   receiving, from a miner, a request for a portion of the rejected subset of target data;
   requesting, from the first participant, the portion of the rejected subset of target data;
   receiving the portion of the rejected subset of target data; and posting the portion of the rejected subset of target data to the results database.

2. The method of claim 1, wherein the set of policy criteria includes a set of policy options and a set of policy details.

3. The method of claim 2, wherein filtering the subset of target data includes applying line item edits from the first participant.

4. The method of claim 2, wherein the set of policy options includes an option to opt-out, an option to exclude a particular target data point, an option to exclude a set of grouped target data, an option to exclude personally identifiable data, and an option to show only aggregated data.

5. The method of claim 1, wherein filtering the subset of target data includes anonymizing the subset of data.

6. The method of claim 1, further comprising:
analyzing one or more subsets of target data in the results database, using a set of cognitive features; and
reporting a set of analysis results.

7. The method of claim 6, wherein the set of cognitive features includes entity extraction, sentiment analysis, keyword extraction, concept tagging, relation extraction, taxonomy classification, expertise extraction, language detection, text extraction, and linked data support.

8. The method of claim 1, wherein gathering the plurality of target data further comprises:
obtaining, from an encrypted data store, access credentials for the plurality of participants;
determining the access credentials are valid; and
gathering, by the set of gather agents, the set of target data using the access credentials, according to the set of policy criteria.

9. The method of claim 1, wherein software is provided as a service in a cloud environment to manage the private data for cognitive surveys.

10. A system for managing private data for surveys, the system comprising:
a memory with program instructions stored thereon; and
a processor in communication with the memory, wherein the system is configured to execute a set of actions, comprising:
deploy a set of gather agents;
gather by the set of gather agents, a plurality of target data associated with a plurality of participants, wherein a first set of target data within the plurality of target data is collected according to a first set of policy criteria for a first participant, and wherein a second set of target data within the plurality of target data is collected according to a second set of policy criteria for a second participant;
determine the first participant has requested to review a subset of the first set of target data;
prompt the first participant to review the subset of target data;
determine the first participant rejected the subset of target data;
filter the subset of target data;
post the filtered subset of target data and the second set of target data to a results database;
receive, from a miner, a request for a portion of the rejected subset of target data;
request, from the first participant, the portion of the rejected subset of target data;
receive the portion of the rejected subset of target data; and
post the portion of the rejected subset of target data to the results database.

11. The system of claim 10, wherein the set of policy criteria includes a set of policy options and a set of policy details.

12. The system of claim 11, wherein filtering the subset of target data includes applying line item edits from the first participant.

13. The system of claim 11, wherein the set of policy options includes an option to opt-out, an option to exclude a particular target data point, an option to exclude a set of grouped target data, an option to exclude personally identifiable data, and an option to show only aggregated data.

14. The system of claim 10, wherein the set of actions further comprises:
analyzing one or more subsets of target data in the results database, using a set of cognitive features; and
reporting a set of analysis results.

15. The system of claim 14, wherein the set of cognitive features includes entity extraction, sentiment analysis, keyword extraction, concept tagging, relation extraction, taxonomy classification, expertise extraction, language detection, text extraction, and linked data support.

16. A computer program product for managing private data for surveys, the computer program product comprising a computer readable storage medium having program instructions embodied therewith, the program instructions executable by a device to cause the device to execute a set of actions, comprising:
deploying a set of gather agents;
gathering, by the set of gather agents, a plurality of target data associated with a plurality of participants, wherein a first set of target data within the plurality of target data is collected according to a first set of policy criteria for a first participant, and wherein a second set of target data within the plurality of target data is collected according to a second set of policy criteria for a second participant;
determining the first participant has requested to review a subset of the first set of target data;
prompting the first participant to review the subset of target data;
determining the first participant rejected the subset of target data;
filtering the subset of target data;
posting the filtered subset of target data and the second set of target data to a results database;
receiving, from a miner, a request for a portion of the rejected subset of target data;
requesting, from the first participant, the portion of the rejected subset of target data;
receiving the portion of the rejected subset of target data; and
posting the portion of the rejected subset of target data to the results database.

17. The computer program product of claim 16, wherein the set of policy criteria includes a set of policy options and a set of policy details.

18. The computer program product of claim 17, wherein filtering the subset of target data includes applying line item edits from the first participant.

19. The computer program product of claim 17, wherein the set of policy options includes an option to opt-out, an option to exclude a particular target data point, an option to exclude a set of grouped target data, an option to exclude personally identifiable data, and an option to show only aggregated data.

20. The computer program product of claim 16, wherein the set of actions further comprises:

analyzing one or more subsets of target data in the results database, using a set of cognitive features; and reporting a set of analysis results.

\* \* \* \* \*